United States Patent [19]
Lamm

[11] 3,926,539
[45] Dec. 16, 1975

[54] ROTARY PISTON INTERNAL COMBUSTION ENGINE

[75] Inventor: Heinz Lamm, Esslingen-St. Bernhardt, Germany

[73] Assignee: Daimler-Benz Aktiengesellschaft, Germany

[22] Filed: May 8, 1973

[21] Appl. No.: 358,319

[30] Foreign Application Priority Data
May 9, 1972  Germany............................ 2222632

[52] U.S. Cl.......... 418/149; 277/235 B; 277/DIG. 6
[51] Int. Cl.². F01C 19/00; F02F 11/00; F16J 15/14
[58] Field of Search.................... 418/149, 178, 179; 123/8.01; 277/235 A, 235 B, DIG. 6; 417/DIG. 1

[56] References Cited
UNITED STATES PATENTS

| | | | |
|---|---|---|---|
| 2,289,620 | 7/1942 | Bernstein ......................... | 277/235 B |
| 2,738,775 | 3/1956 | Smyser............................ | 418/178 X |
| 2,966,860 | 1/1961 | Maynard.......................... | 418/178 X |
| 3,394,877 | 7/1968 | Hantzsche et al. ............. | 418/178 X |
| 3,575,538 | 4/1971 | Berkowitz........................ | 418/149 X |
| 3,608,914 | 9/1971 | Harby............................... | 277/235 B |
| 3,791,781 | 2/1974 | Fujiyama et al. .................... | 418/179 |

FOREIGN PATENTS OR APPLICATIONS

| | | | |
|---|---|---|---|
| 1,921,998 | 11/1970 | Germany......................... | 277/235 B |
| 2,057,794 | 6/1971 | Germany ............................ | 418/178 |

*Primary Examiner*—C. J. Husar
*Assistant Examiner*—Michael Koczo, Jr.
*Attorney, Agent, or Firm*—Craig & Antonelli

[57] ABSTRACT

A rotary piston internal combustion engine of trochoidal construction which consists of at least one housing casing, two lateral parts and possibly one or several intermediate parts; at least one of two mutually abutting contact surfaces of the housing parts are provided with a soft thin metallic or synthetic plastic coating which has a layer thickness of at most 0.2 mm prior to the assembly of the housing parts and is able to withstand temperatures of the order of 200° C.

17 Claims, 1 Drawing Figure

U.S. Patent  Dec. 16, 1975  3,926,539
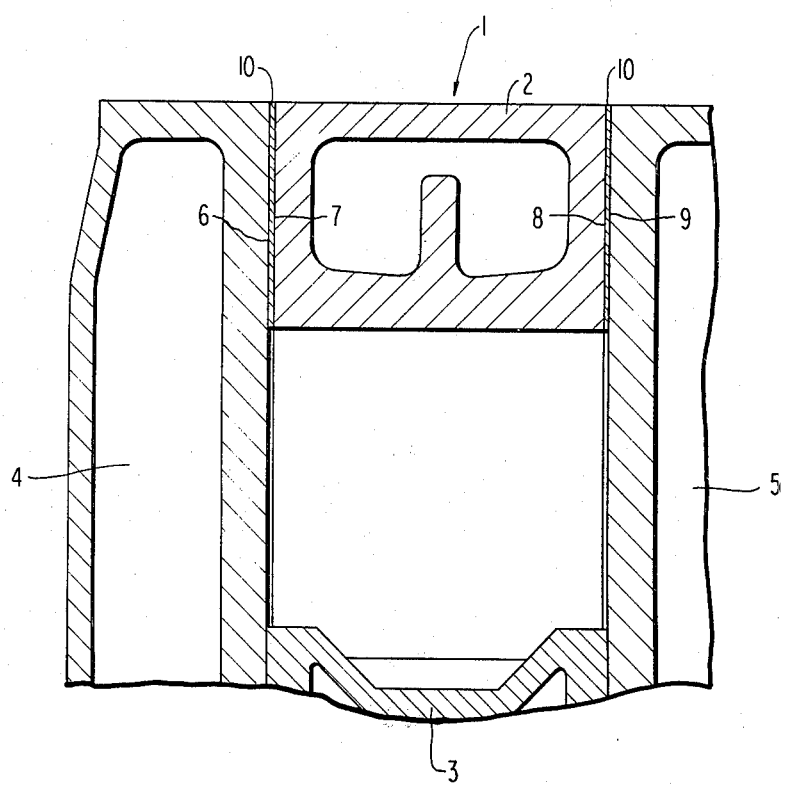

ROTARY PISTON INTERNAL COMBUSTION ENGINE

The present invention relates to a rotary piston internal combustion engine of trochoidal type of construction consisting of at least one housing casing, two lateral parts and possibly one or several intermediate parts.

A main problem in rotary piston internal combustion engines still is the insufficient gas tightness between the individual housing parts. The sealing takes place conventionally by purely metallic means, i.e., the contact surfaces of the housing parts which are ground plane-parallel, are directly connected with each other by tie-rods. Since the operating temperatures along the circumference of the housing parts differ strongly from one another, especially within the area of the cold and hot arc, differing expansions of the material occur as a result of these uneven warm-ups. The consequence is that the mutually abutting housing parts become gas untight and thus a blowing-through of gas toward the outside takes place. As a result thereof, gases valuable to the compression-and combustion-space are lost which has a disadvantageous effect on the output of the internal combustion engine.

The present invention is concerned with the task to undertake simple measures which eliminate these shortcomings in an advantageous manner.

It is therefore proposed according to the present invention that at least one of two mutually abutting contact surfaces of the housing parts are provided with a soft and thin metallic or synthetic plastic coating which at the most has a layer thickness of about 0.2 mm prior to the assembly of the housing parts and is able to withstand temperatures of at least about 200°C.

The application of the coating material can take place according to the present invention by plating the films or with the use of the conventional screen-printing process.

Accordingly, it is an object of the present invention to provide a rotary piston internal combustion engine which avoids by simple means the aforementioned shortcomings and drawbacks encountered in the prior art.

Another object of the present invention resides in a rotary piston internal combustion engine of trochoidal construction which greatly improves the gas tightness of the engine by simple means, thereby also increasing the efficiency of the engine.

A further object of the present invention resides in a rotary piston internal combustion engine which permits the compensation by extremely simple and inexpensive means of the different thermal expansions of the various engine parts due to different temperatures of these parts.

These and further objects, features, and advantages of the present invention will become more apparent from the following description when taken in connection with the accompanying drawing which shows, for purposes of illustration only, one embodiment in accordance with the present invention, and wherein:

The single FIGURE is a partial cross-sectional view through a rotary piston internal combustion engine of trochoidal construction in accordance with the present invention.

Referring now to the single FIGURE of the drawing, a rotary piston internal combustion engine generally designated by reference numeral 1 which is of conventional construction and essentially consists of a housing casing 2, of a piston 3 rotating within the housing casing 2 and of two lateral parts 4 and 5, is provided at one of the mutually abutting contact surfaces 6, 7 and 8, 9 of the housing parts with a thin, soft and deformable coating 10 which consists of a metallic or synthetic plastic material.

In the illustrated embodiment shown in the drawing, the elastic layer 10 is applied onto the contact surfaces 7 and 8 of the housing casing 2. However, the layer 10 may also be applied onto the contact surfaces 6, 9 or onto the contact surfaces 7, 9 or 6, 8 of the housing parts. Furthermore, two very thin coatings or layers each may provide a seal with respect to each other, which means that the layer of one housing part and the layer of the other housing part are in contact with one another.

A film or foil consisting of tin, zinc or lead may be used as soft, metallic coating material which is pressed by conventional means onto the contact surface of the housing part to be coated.

Prior to the application, the paper film arranged on both sides for the support of the metallic foil is to be removed. The parts of the metallic foil which after the pressing-on operation cover off the inlet and discharge apertures for the cooling medium and the bores for the tie-rods or the like at the respective housing part, are pulled through the bores, for example, by a method operating with vacuum or are forced through with the aid of rubber punches.

With the use of synthetic plastic-like foils or films, only such materials are applied against the contact surfaces of the housing parts which are insensitive against gasoline, oil, cooling medium and exhaust gases. The application of such foils which, in addition to the synthetic plastic material, may also contain a very fine metallic powder, takes place according to the conventional screen-printing method. The synthetic plastic materials usable with the present invention are those which meet the aforementioned requirements. Since these materials are well known in the art, a detailed description of the long list of such synthetic plastic materials, particularly synthetic resinous materials is dispensed with herein. Furthermore, the metallic powders in finely divided form which are contained in these plastic materials are also known as such, whence a detailed description is dispensed with herein. Typical examples of the synthetic plastic materials are Teflon and "Grafoil", the latter being a product of Union Carbide. Aluminum powder in finely divided form may be added to the synthetic plastic materials in desired quantities.

The metal or synthetic plastic foils or films are applied so uniformly thin that an after-treatment of the coated contact surface is not necessary. After the assembly of the housing parts, the deformable foils are compressed by about 50% of the layer thickness in order not to impair the internal gas tightness.

The foil or film must further be so constructed that no internal, inherent stresses occur as well as a tearing and peeling off are avoided even with relatively large temperature fluctuations.

During the assembly of the housing parts, the layer material must have good sliding properties in order that they can be arranged as free of stress as possible.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A rotary piston internal combustion engine including several rotary piston internal combustion engine housing parts having at least two mutually abutting contact surfaces and consisting of at least one housing casing means and two lateral parts, characterized in that at least one of said mutually abutting contact surfaces of the rotary piston internal combustion engine housing parts is provided with a synthetic plastic coating which coating provides a seal between said contact surfaces, which seal contacts both of said mutually abutting contact surfaces.

2. A rotary piston internal combustion engine according to claim 1, characterized in that the coating is a deformable foil which is compressible by about 50% of its uncompressed thickness.

3. A rotary piston internal combustion engine according to claim 1, characterized in that only one of the mutually abutting contact surfaces of the respective housing parts is provided with the coating.

4. A rotary piston internal combustion engine according to claim 1, characterized in that both of said two mutually abutting contact surfaces of the respective housing parts are provided with said coating.

5. A rotary piston internal combustion engine according to claim 1, characterized in that the housing parts include at least one intermediate part.

6. A rotary piston internal combustion engine according to claim 1, characterized in that the coating is compressed between the two mutually abutting contact surfaces.

7. A rotary piston internal combustion engine according to claim 1, characterized in that said coating has a maximum layer thickness of about 0.2 mm prior to assembly of the housing parts and is able to withstand temperatures of about 200°C.

8. A rotary piston internal combustion engine including several rotary piston internal combustion engine housing parts having at least two mutually abutting contact surfaces and consisting of at least one housing casing means and two lateral parts, characterized in that at least one of said two mutually abutting contact surfaces of the rotary piston engine housing parts is provided with a coating consisting of a member selected from the group consisting of tin, zinc and lead which coating provides a seal between said contact surfaces, which seal contacts both of said mutually abutting contact surfaces.

9. A rotary piston internal combustion engine according to claim 8, characterized in that the coating is a thin metallic coating.

10. A rotary piston internal combustion engine according to claim 8, characterized in that the coating contains an added fine metallic powder.

11. A rotary piston internal combustion engine according to claim 8, characterized in that the seal is compressible to about 50% of its uncompressed thickness.

12. A rotary piston internal combustion engine according to claim 11, characterized in that both of said two mutually abutting contact surfaces of the respective housing parts are provided with said seal, between which surfaces the seal is compressed.

13. A rotary piston internal combustion engine according to claim 8, characterized in that the engine further includes a rotary piston which is contained within said several housing parts.

14. A rotary piston internal combustion engine according to claim 8, characterized in that the seal directly contacts both of said two contact surfaces.

15. A rotary piston internal combustion engine according to claim 12, characterized in that the seal directly contacts both of said two contact surfaces.

16. A rotary piston internal combustion engine according to claim 8, characterized in that the coating is compressed between the two mutually abutting contact surfaces.

17. A rotary piston internal combustion engine according to claim 8, characterized in that said coating has a maximum layer thickness of about 0.2 mm prior to assembly of the housing parts and is able to withstand temperatures of about 200°C.

* * * * *